United States Patent [19]
Quinquis

[11] Patent Number: 4,467,418
[45] Date of Patent: Aug. 21, 1984

[54] DATA TRANSMISSION SYSTEM RESOLVING ACCESS CONFLICTS BETWEEN TRANSMITTERS-RECEIVERS TO A COMMON BUS

[76] Inventor: Jean-Paul Quinquis, rue de Cornic, Perros-Guirec, France, 22700

[21] Appl. No.: 301,837

[22] Filed: Sep. 14, 1981

[30] Foreign Application Priority Data

Sep. 12, 1980 [FR] France ............... 80 19751

[51] Int. Cl.³ ............... G06F 15/16; G06F 15/40
[52] U.S. Cl. ............... 364/200
[58] Field of Search ... 364/200 MS File, 900 MS File

[56] References Cited

U.S. PATENT DOCUMENTS

| | | | |
|---|---|---|---|
| 3,699,529 | 10/1972 | Byers et al. | 364/200 |
| 3,886,524 | 5/1975 | Appelt | 364/200 |
| 4,096,571 | 6/1978 | Vander Mey | 364/200 |
| 4,148,011 | 4/1979 | McLagan | 364/900 X |
| 4,228,496 | 10/1980 | Katsman et al. | 364/200 |
| 4,229,791 | 10/1980 | Levy | 364/200 |
| 4,237,534 | 12/1980 | Felix | 364/200 |
| 4,281,380 | 7/1981 | DeMesa | 364/200 |
| 4,281,381 | 7/1981 | Ahuja | 364/200 |
| 4,313,196 | 1/1982 | Oblonsky | 364/200 X |
| 4,363,094 | 12/1982 | Kaul et al. | 364/200 |
| 4,374,413 | 2/1983 | Comfort | 364/200 |

Primary Examiner—Harvey E. Springborn
Attorney, Agent, or Firm—Lowe, King, Price & Becker

[57] ABSTRACT

A data transmission system settles access conflicts of plural data transmitters-receivers to a common data transmission bus. The transmitters-receivers are asynchronous, unranked processors interconnected by an arbitration bus, in addition to the data transmission bus. A transmitter-receiver requesting service must gain access to the arbitration bus to access the data transmission bus. If several transmitters-receivers are simultaneously requesting service, they randomly draw arbitration pulses of randomly distributed durations and simultaneously apply these arbitration pulses to the arbitration bus for marking the same. The transmitters-receivers test, at the end of their respective arbitration pulses, the state of the arbitration bus. The transmitter-receiver which finds the unmarked arbitration bus, accesses the data transmission bus.

4 Claims, 10 Drawing Figures

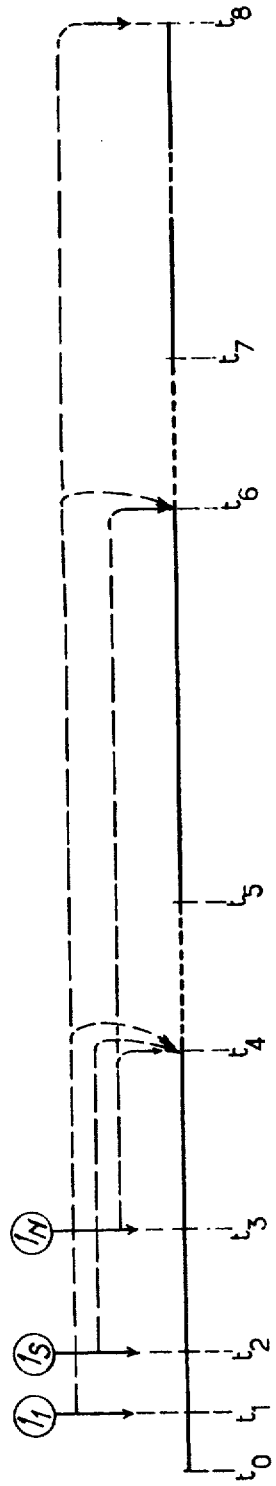

FIG.6 (PRIOR ART)

$t_0-t_4$ transmission phase for a data message between a station $1_P$ and a station $1_Q$
$t_1$ station $1_1$ attempts to capture the data bus : no success, it waits
$t_2$ station $1_S$ attempts to capture the data bus ; no success, it waits
$t_3$ station $1_N$ attempts to capture the data bus : no success, it waits
$t_4$ end of message transmission between $1_P$ and $1_Q$ , freeing the data bus. Stations $1_1$ , $1_S$ , $1_N$ are in conflict
$t_4-t_5$ conflict resolving phase between $1_1$ , $1_S$ and $1_N$ . $1_S$ assumes priority
$t_5-t_6$ transmission phase of a data message between station $1_S$ and its destination : station $1_3$ for example
$t_6$ end of message transmission between $1_S$ and $1_3$ , freeing of the data bus. Stations $1_1$ and $1_N$ are in conflict
$t_6-t_7$ conflict resolving phase between $1_1$ and $1_N$

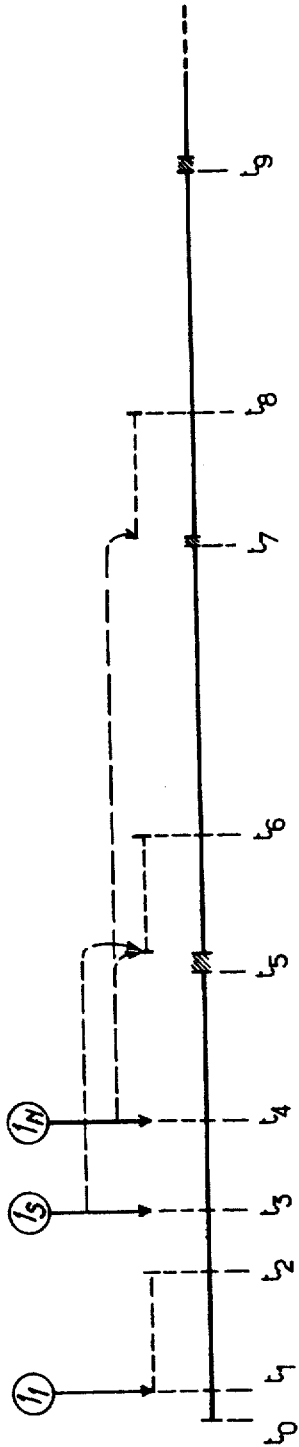

FIG.7

$t_0 - t_5$ transmission phase of a data message between a station $1_p$ and a station $1_Q$
$t_1$ station $1_1$ is a requestor candidate
$t_1 - t_2$ station $1_1$ allocation phase
$t_2$ station $1_1$ assumes priority over the data bus, but must wait until $t_5$ to transmit its data
$t_3$ and $t_4$, station $1_S$ and $1_N$ try to capture the bus ; no success, they wait
$t_5$ end of message transmission from $1_p$ to $1_Q$ ; station $1_1$ starts transmitting its data and stations $1_S$ and $1_N$ renew their attempt to take the bus
$t_6$ conflict resolving phase between $1_S$ and $1_N$ – $1_S$ for example assumes priority over the bus but does not transmit its data until $t_7$

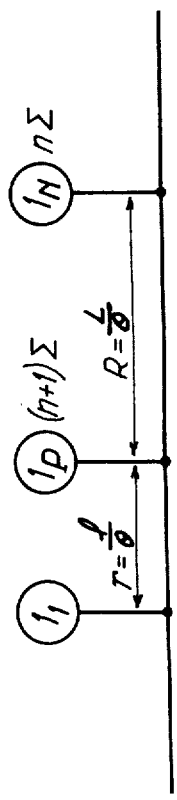

DATA TRANSMISSION SYSTEM RESOLVING ACCESS CONFLICTS BETWEEN TRANSMITTERS-RECEIVERS TO A COMMON BUS

BACKGROUND OF THE INVENTION

1. Field of the Invention

The invention generally concerns the control of data transmission within real time parallel systems where control is effected by distributing control units throughout the system and, more particularly, a decentralized priority control data transmission system.

Systems of this type comprise a plurality of asynchronous processors or the like which are interconnected in parallel to a bus. Each processor is connected to the bus by an interface, known as a processor coupler or bus controller. This processor coupler, on the one hand, manages data exchange protocols between an originating processor (or requestor) and a terminating processor (or server) and, on the other hand, performs a dynamic priority control.

There are as many couplers as processors; they are all identical. For convenience sake, the association between a processor, a corresponding coupler and an allocator circuit is referred to as a station.

In any system of parallel and asynchronous processors organized around a resource or common resources (in the present case, the bus) conflict situations are inevitable when two or more stations attempt to gain access to the bus simultaneously in order to transmit information to other stations conflicts also occure when the bus becomes free if two or several stations were candidates to use the bus whilst the bus was unavailable because the bus was conveying information.

To preclude access collisions adversely affecting the correct operation of the system as a whole, use is made of arbitration and priority assignment circuity. The arbitration and priority circuitry selects just one of the conflicting stations. Then the arbitration and priority means allocates the bus to the selected station for the time required for that station to propagate its information message. At the end of this period of time, those stations that were previously temporarily rejected make a further attempt to gain access to the bus, thus re-activating the arbitration circuity. The process continues for the waiting stations.

It will also be noted that the multiprocessor systems organized around a bus link readily execute a logic addressing process by diffusion. A station requesting a service, a task, a function, etc. performable by a station in the system may overlook the geographical location and the name (or physical label) of the concerned station or stations in the even of a duplication or multiplication of the stations executing one and the same task for work sharing or operational safety reasons. Indeed, the logic name of the function (service or task) merely has to be transmitted along a DATA bus for the station or stations capable of processing the function, service or task to take account of the request after only one message. The advantages are considerable:

1—there are no software tables associating the logic name of the function with the addresses of the stations capable of performing it to be consulted beforehand.

2—immediate access to an available station conversant with the task to be done without having to resort to a scan search should the first physically addressed station be either overloaded or faulty.

3—quick reconfiguration since there is no up-dating of the software tables mentioned under point 1.

4—possibility for each station of recognizing several logic function addresses.

The difficulty that must be resolved consists of selecting only one station from amongst perhaps many of those capable of performing the function. An arbitration device governing the servers achieves this operation.

2. Description of the Prior Art

L. Nisnevich and E. Strasbourger in "Decentralized Priority Control in Data Communication", Second Annual Symposium on Computer Architecture, Houston, Tex., held from Jan. 20th to 22nd 1975, pages 1 to 6, put forward a scheme for a priority changing system. In this scheme, the bus may be in three states: "transmit 1", "transmit 0", or "no transmission". The "no transmission" signal causes all the active processor couplers to transmit the highest weight (most significant) bit (left most) of their addresses into the bus. In other words, after a message has been transmitted and the bus turns to the "no transmission" state, the active processor couplers start transmitting their own addresses to the bus. If at least one of the transmitted bits is a one then the bus is in the "transmit 1" state, while if all the transmitted bits are zero, the bus is in the "transmit 0" state. The coupler of processor No. i compares the state of the bus with its own weight bit. If the bus is in the "transmit 1" state and coupler No. i has transmitted a "0", then the coupler switches itself off and awaits the next "no transmission" state. Otherwise, coupler No. i remains connected to the bus.

Each processor coupler which remains connected to the bus transmits its second address bit to the bus which turns to a "transmit 1" or "transmit 0" state. All of the processor couplers which have sent the second bit thereof behave as they did following the transmission of the first bit thereof. In other words, if the bus is in the "transmit 1" state all te processor couplers which have sent the "0" signal are switched to off and await the next "no transmission" state. This process is repeated until all the address bits have been transmitted.

After the last bit has been transmitted, only one processor remains connected to the channel (its processor coupler having seized the bus). The address of this processor is greater than the addresses of all of the other couplers that have been trying to occupy the bus during this period.

The drawbacks of this system are that the different processors must be synchronous in order to synchronously transmit the respective address bits of a given weight and that the bus must have a line for each address bit and a line for each processor.

SUMMARY OF THE INVENTION

The invention provides a data transmission and access conflict settling system including a plurality of asynchronous and unranked data transmitters-receivers divided into a requestor category and a server category, the transmitters-receivers of the server category being capable of implementing services requested by the transmitters-receivers of the requestor category, the said transmitters-receivers being interconnected by (1) a data transmission bus, (2) an occupation bus the state of which depends upon the availability or unavailability of the data transmission bus and (3) an arbitration bus, said data transmission system comrising in each transmitter-receiver:

an allocation circuit associated with the transmitter-receiver and selectively connecting the transmitter-receiver to the arbitration bus, said allocation circuit having means for marking and testing said arbitration bus;

an arbitration pulses generator producing arbitration pulse having randomly distributed durations, the durations of the arbitration pulses generated by the arbitration pulse generator in the different transmitters-receivers being different;

means controlled by a transmitter-receiver requesting service for activating the arbitration pulse generator and randomly extracting therefrom an arbitration pulse;

means for activating the marking means of the allocation circuit while said randomly extracted arbitration pulse is being derived;

means for activating the testing means of the allocation circuit at the end of said randomly extracted arbitration pulse, the means for activating the testing means deriving a binary test pulse having a binary value dependent on whether the arbitration bus is marked or unmarked; and means for enabling the transmitter-receiver to seizure the data transmission bus in response to the state of the occupation bus and the binary value of the test pulse.

BRIEF DESCRIPTION OF THE DRAWINGS

The invention is now described in detail with reference to the drawings appended hereto in which:

FIGS. 6 and 7 are respectively timing diagrams for the operation of the prior art and the present invention to assist in explaining the differences between a system of parallel processors with allocation and transmission phases in cascade and allocation and transmission phases in parallel;

FIGS. 10 and 11 are timing diagrams to assist in explaining determination of the minimum difference between the durations of two arbitration temporization signals.

Figure 1:
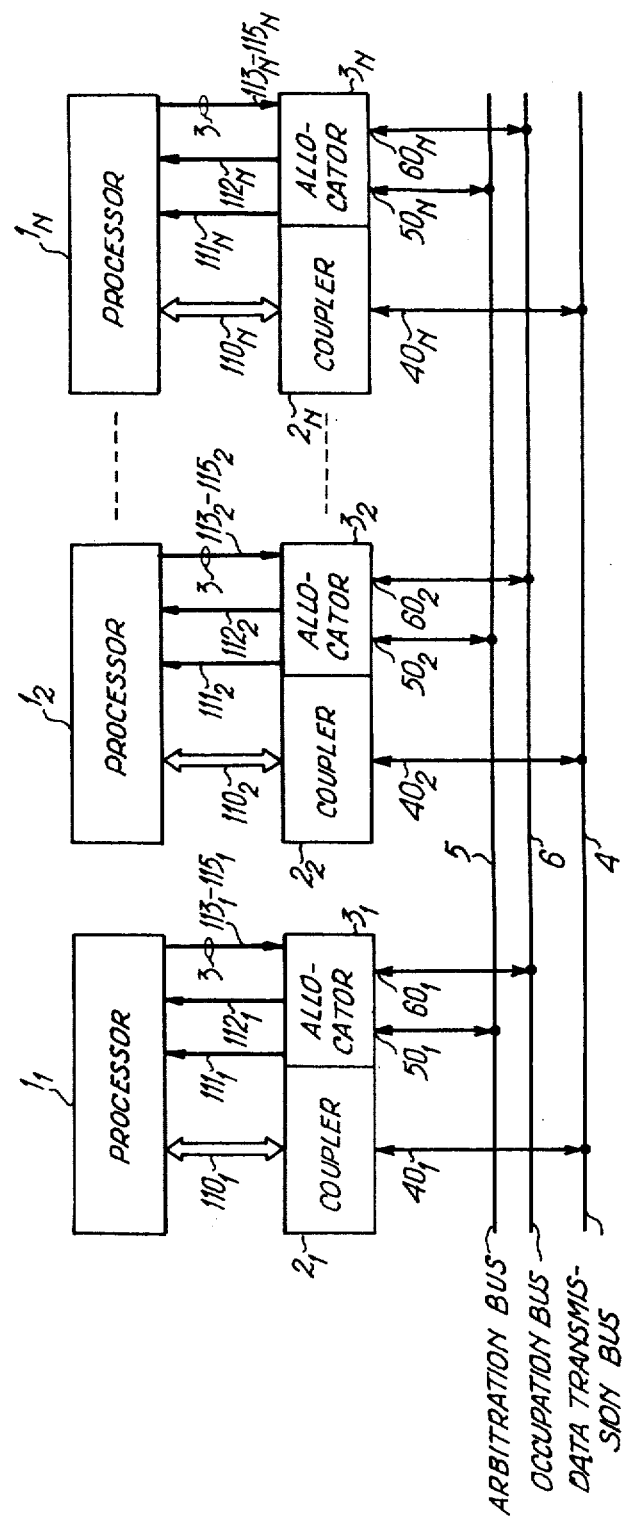
FIG. 1 is a block-diagram of the system with parallel processors connected to a common DATA bus interconnecting them, wherein each station is illustrated as including a coupler and an allocator in accordance with the invention.

Referring first to FIG. 1, several processors $1_1$, $1_2$, ... $1_N$ are respectively linked together by means of connections $110_1$, $110_2$ ... $110_N$, couplers $2_1$, $2_2$, ... $2_N$ and connections $40_1$, $40_2$, ... $40_N$ to a DATA TRANSMISSION bus 4. Processors $1_1$, $1_2$, ... $1_N$ are also respectively linked by means of connections ($111_1$-$115_1$), ($111_2$-$115_2$), ... ($111_N$-$115_N$), allocators $3_1$, $3_2$, ... $3_N$, as well as connections $50_1$, $50_2$, ... $50_N$ and $60_1$, $60_2$, ... $60_N$ to an ARBITRATION bus 5 and an OCCUPATION bus 6.

Allocators $3_1$, $3_2$, ... $3_N$ are circuits each having a structure illustrated in FIG. 2. An allocator 3 is made up of a quartz-controlled oscillator 301, an arbitration temporization generator 300, a "request" arbitrator 3000 and a "serve" arbitrator 3500. Arbitration temporization generator 300 is activated by a "start" signal emitted either along wire 3010 by "request" arbitrator 3000, or along wire 3510 by "serve" arbitrator 3500. The start signal is coupled to arbitration temporization generator 300 via OR gate 307 and terminal 310. This "start" signal causes a test signal to be derived on terminal 311 after a given delay. This temporization delay between the start signal and the test signal is obtained by counter 302 which decrements down to zero a temporization delay randomly extracted from binary code field 303. A "priority presetting" or forcing signal, on wire 325 activates arbitration temporization generator 300 to the highest temporization delay under control of the processor associated with the allocator.

Figure 2:
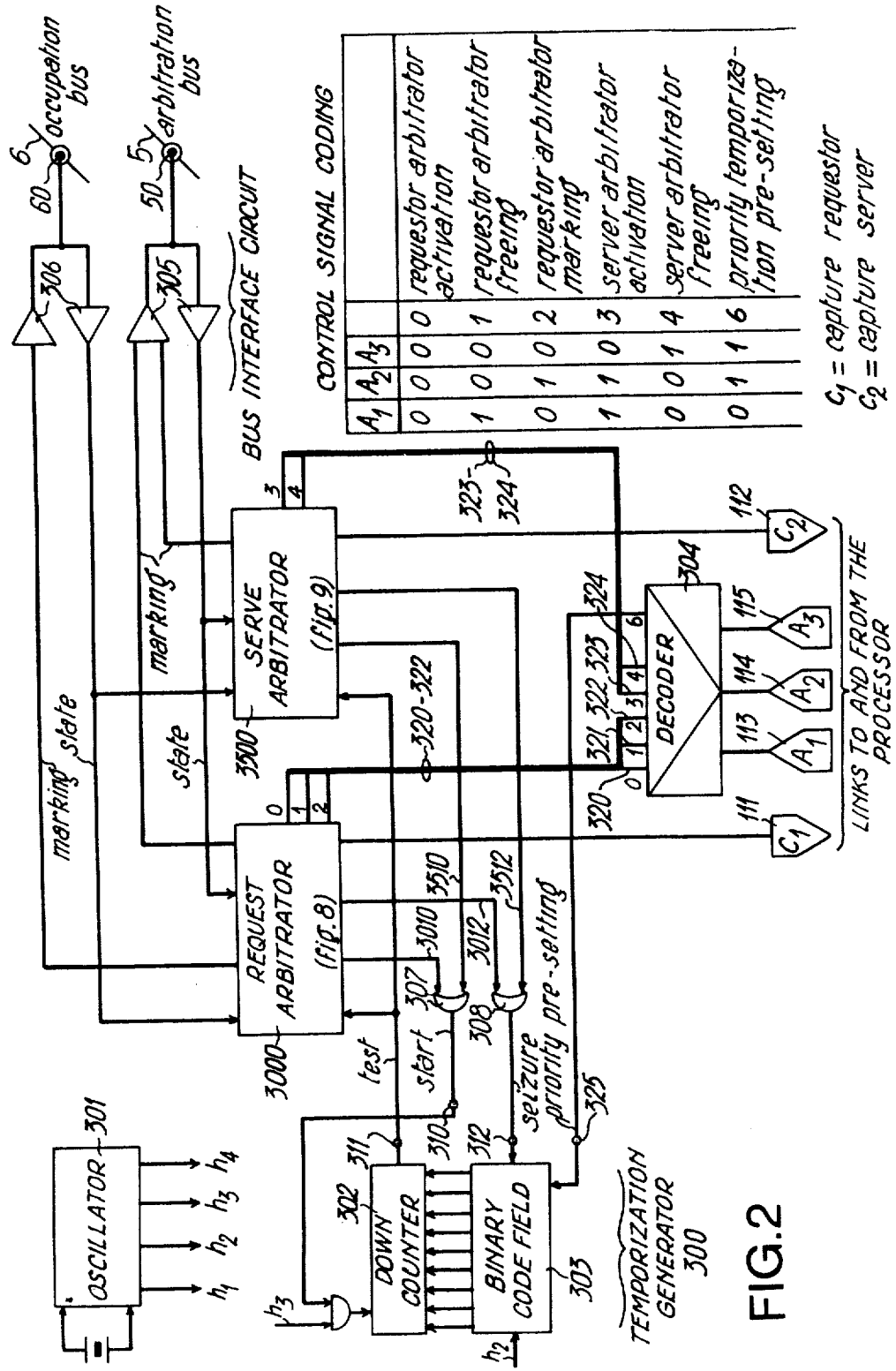
FIG. 2 is a block-diagram of an allocator.

The allocator further comprises a decoder 304 which receives binary control information generated by the station processor; the significance of the control information appears in Table 1, and is none other than the key table to FIG. 2.

TABLE I

| $A_1$ | $A_2$ | $A_3$ | | |
|---|---|---|---|---|
| 0 | 0 | 0 | 0 | request arbitrator activation |
| 1 | 0 | 0 | 1 | request arbitrator freeing |
| 0 | 1 | 0 | 2 | request arbitrator marking |
| 1 | 1 | 0 | 3 | serve arbitrator activation |
| 0 | 0 | 1 | 4 | serve arbitrator freeing |
| 0 | 1 | 1 | 6 | priority temporization presetting |

Circuits 305 forming an interface with ARBITRATOR bus 5 and 306 with OCCUPATION bus 6 connect "request" ARBITRATOR circuit 3000 and "serve" ARBITRATOR circuit 3500 to buses 5 and 6 respectively.

Each allocator is thus a self-contained entity, physically independent of link 40 to the data transmission bus, interconnected, on the one hand, to its equivalents in the other stations by two specialized bus links 5 and 6 and, on the other hand, each allocator is connected by a 5 wire point-to-point link 111-115 to the processor in the station that includes the allocator.

ARBITRATION bus 5 and OCCUPATION bus 6 are multipoint, single-wire, physical links capable of reaching lengths of several tens of meters; bus 5 carries the arbitration codes whilst bus 6 indicates whether the DATA bus is available or engaged. Buses 5 and 6 both carry one of two electrical potentials, 0 v, +3 v corresponding to logic levels 0 and 1 respectively.

ARBITRATION bus 5

Level 1 (marking) prevents a request station or a serve station from seizing the DATA bus; the first level 1 must await the unmarking (or freeing) of the arbitration and the second level 1 is immediately rejected.

Marking at level 1 is caused:

by a request or serve candidate being in an allocation phase in response to emission of its arbitration temporization delay pulse; or by the requestor and server stations to which the DATA bus is already assigned being in the information exchange phase.

OCCUPATION bus 6

This is in the 1 state throughout the whole exchange phase between a requestor and a server.

It is in the 0 state when the DATA TRANSMISSION bus is at rest.

Combination of the ARBITRATION and OCCUPATION bus states authorizes or prevents access attempts of the allocators in the request and serve stations.

TABLE II

| ARBITRATION BUS 5 | OCCUPATION BUS 6 | REQUEST ARBITRATOR 300 | SERVER ARBITRATOR 3500 |
|---|---|---|---|
| 0 | 0 | authorized | rejected |
| 0 | 1 | stand-by | authorized |
| 1 | 0 | stand-by | rejected |
| 1 | 1 | stand-by | rejected |

Request arbitrator 3000 and serve arbitrator 3500 function in the same manner, but request arbitrator 3000 is activated when OCCUPATION bus 6 is at 0; and serve arbitrator 3500, is activated when bus 6 is at 1.

Figure 3:
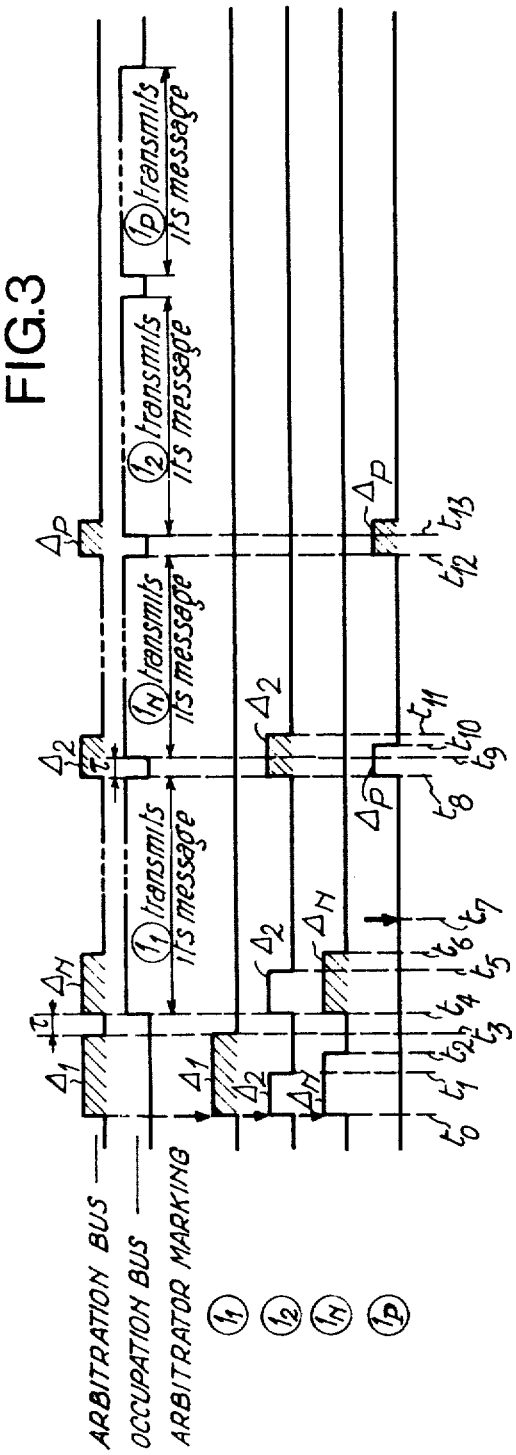
FIGS. 3, 4 and 5 are arbitration chronograms between simultaneous "requestor" candidates, simultaneous "server" candidates and simultaneous "requestor" and "server" candidates.
Figure 4:
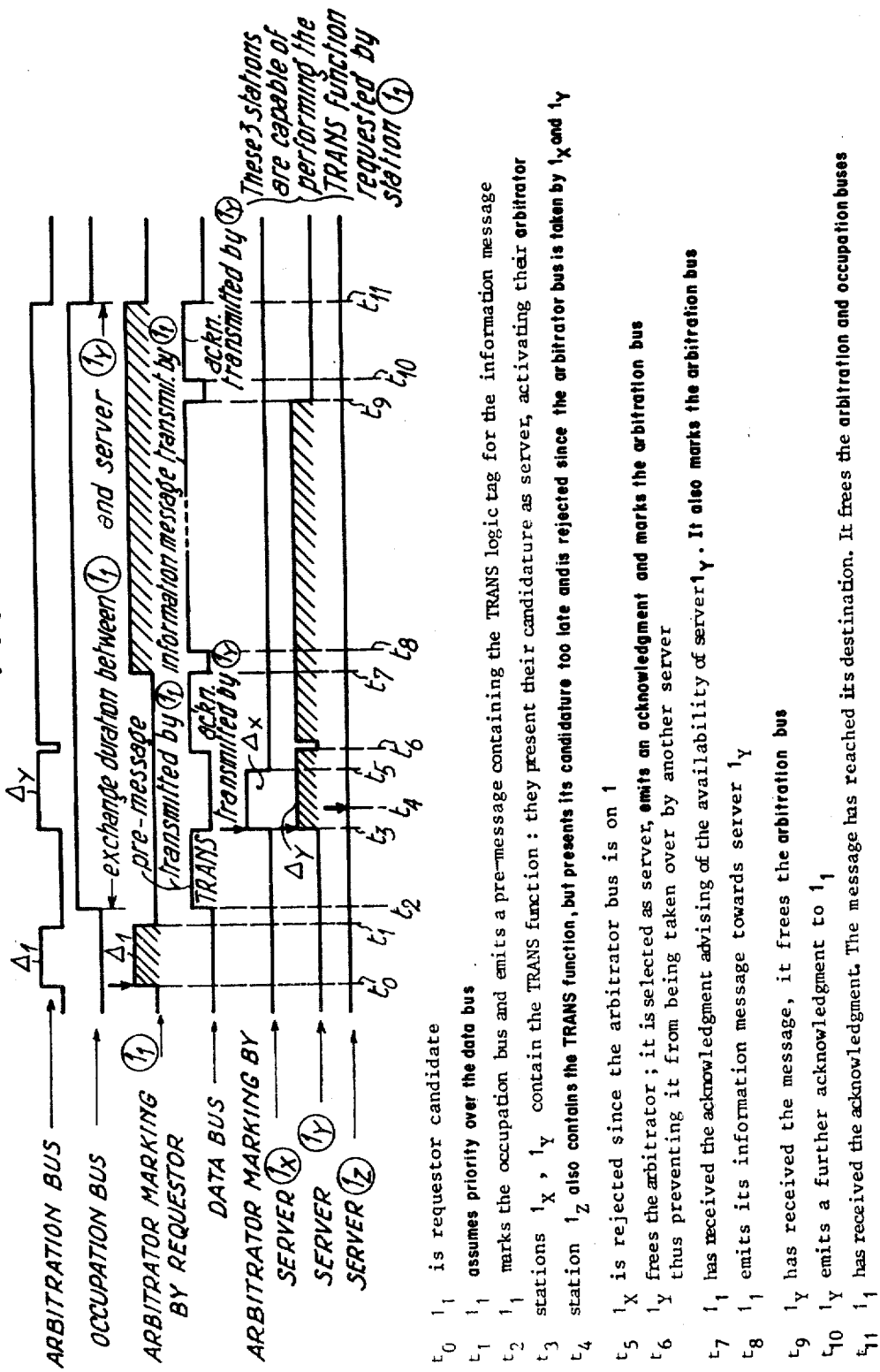
Figure 5:
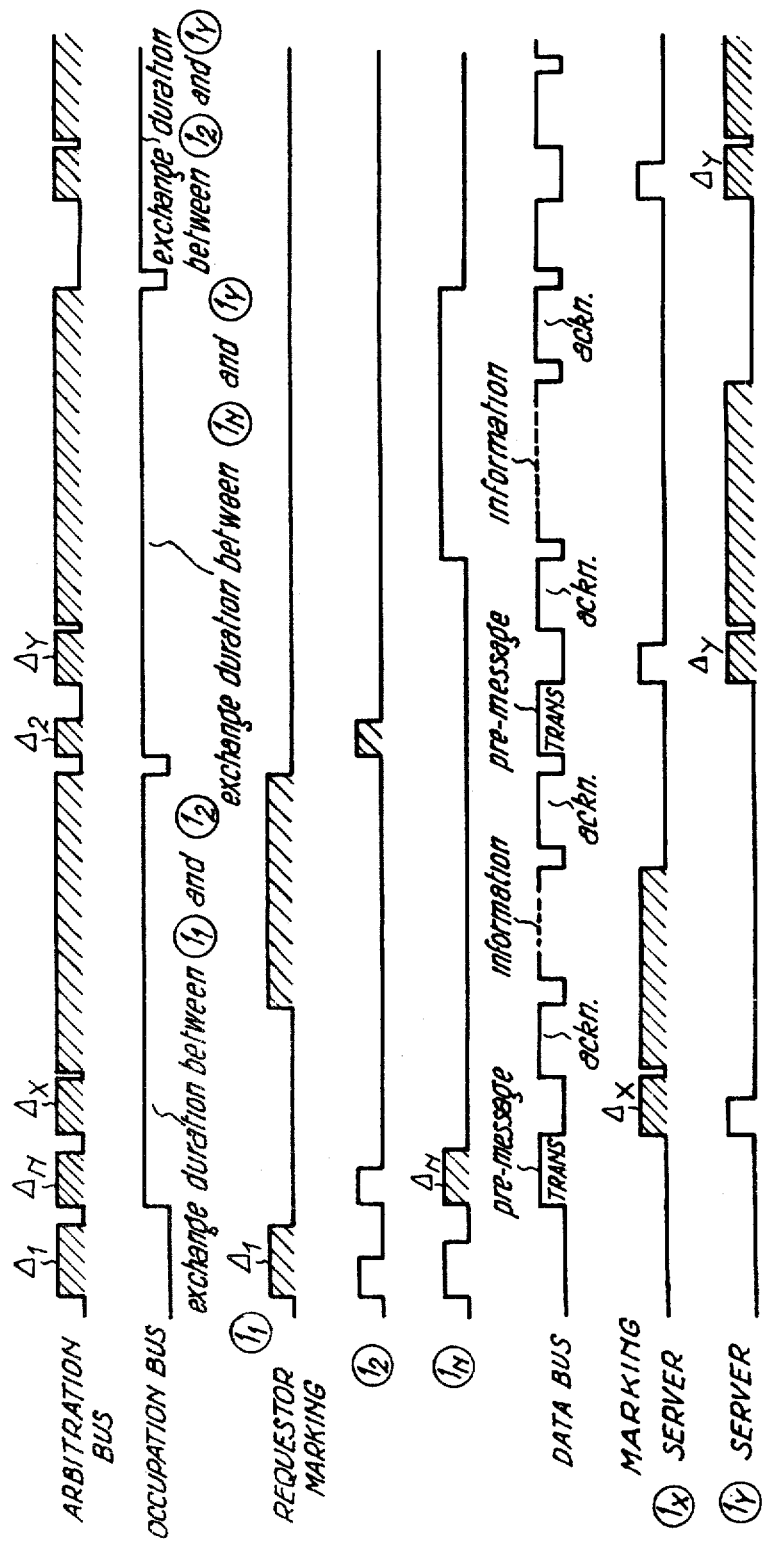

The chronograms illustrated in FIGS. 3 and 4 explain the principle of resolving access conflicts between successively request and serve candidates. The chronograms in FIG. 5 are a synthesis of FIGS. 3 and 4.

Referring to FIG. 3 which represents arbitration chronograms of "request" stations at time $t_0$, the processors of stations $1_1$, $1_2$ and $1_N$ simultaneously activate the allocators $3_1$, $3_2$ and $3_N$ by of the stations applying signal 000 to wires $113_1$–$115_1$, $113_2$–$115_2$ and 113N–115N. ARBITRATION bus 5 is at 0 and OCCUPATION bus 6 is at 0. According to Table I, first line, and Table II, first line, stations $1_1$, $1_2$ and $1_N$ are authorized to emit their arbitration temporization signals thereof so signals $\Delta_1$, $\Delta_2$ and $\Delta_N$ are respectively derived by stations $1_1$, $1_2$, $1_N$. It is assumed that $$\Delta_1 > \Delta_N > \Delta_2$$

At time $t_1$, the arbitration temporization signal $\Delta_2$ of $1_2$ terminates. Station $1_2$ tests the state of the ARBITRATION bus. It is engaged. Station $1_2$ is rejected but maintains its candidature.

At time $t_2$, the arbitration temporization signal $\Delta_N$ of station $1_N$ terminates. The ARBITRATION bus is tested; it is engaged. Station $1_N$ is rejected but maintains its candidature.

At $t_3$, the arbitration temporization signal $\Delta_1$ of station $1_1$ terminates (this is the longest of the arbitration temporization signals). The ARBITRATION bus is tested; it is free. Station $1_1$ assumes priority over the DATA bus.

At time $t_4 = t_3 + \tau$, the processors of stations $1_2$ and $1_N$ activate the allocators of stations $1_1$ and $1_N$ again at a time $\tau$ after having detected that the ARBITRATION bus is free at $t_3$.

At time $t_5$, station $1_2$ is rejected but maintains its candidature.

At $t_6$, station $1_N$ finds the ARBITRATION bus free and assumes priority of the DATA bus but must wait for the OCCUPATION bus to become free before emitting the message thereof.

At time $t_7$, station $1_p$ tries to seize the DATA bus; station $1_p$ is immediately rejected since the OCCUPATION bus is in state 1.

At time $t_8$, of the OCCUPATION bus is freed by station $1_1$. Stations $1_2$ and $1_p$ activate the allocators thereof (it is assumed that $\Delta_p < \Delta_2$).

At time $t_9$, station $1_N$ marks the OCCUPATION bus.

At time $t_{10}$, station $1_p$ is rejected.

At time $t_{11}$, station $1_2$ assumes priority over the DATA bus but emits only at time $t_{13}$.

It can clearly be seen that at time $t_0$, three stations were simultaneously candidates and they were authorized to transmit in the order $1_1$, 1N, $1_2$ of the arbitration temporization signals $\Delta_1 > \Delta_N > \Delta_2$. Similarly at time $t_8$, two stations were simultaneously candidates and they were authrorized to transmit in the order $1_2$, $1_p$ of their arbitration temporization signals $\Delta_2 > \Delta_p$.

A requesting station after having activated its allocator, thus expressing its wish to gain access to the DATA TRANSMISSION bus, may assume the following states:

immediate emission of the arbitration temporization signal, when the ARBITRATION and OCCUPATION buses are at 0;

rejection by a higher-priority allocator resulting in stand-by waiting for awaiting the ARBITRATION bus to become free, which causes the emission of the arbitration temporization signal;

capture of the DATA bus with the immediate emission of a message or stand-by awaiting the freeing of the DATA bus, should it be engaged; and marking the ARBITRATION bus when the station has found a server.

A requestor station can thus wait as a candidate for capturing the DATA bus or as a candidate to which the DATA bus is already assigned although such a station cannot use the DATA bus at once. This procedure makes it possible to achieve the allocation-transmission parallelism.

With reference now being made to FIG. 4 which contains arbitration chronograms for "request" and "serve" stations, it can be seen that:

at time $t_0$, station $1_1$ is a request candidate and emits an arbitration temporization signal;

at time $t_1$, station $1_1$ assumes mastership over the data bus;

at time $t_2$, station $1_1$ marks the OCCUPATION bus and emits a pre-message containing for example the logic label TRANS signifying translation;

at time $t_3$, stations $1_X$ and $1_Y$, likely to fulfil the TRANS function simultaneously, indicate that they are candidates to be a server by activating the allocators thereof, which allocators emit temporization signals $\Delta_X$ and $\Delta_Y$;

at time $t_4$, station $1_Z$ likely also to fulfil the TRANS function presents its candidature but too late, as the ARBITRATION bus has been taken by $1_X$ and $1_Y$; station $1_Z$ is rejected;

at time $t_5$, station $1_X$ is rejected as the ARBITRATION bus is at 1;

at time $t_6$, station $1_Y$ frees the ARBITRATION bus; station $1_Y$ is selected as server and emits an acknowledgment thereof that fact and marks the ARBITRATION bus to prevent the arbitration bus from being taken by another server;

at time $t_7$, station $1_1$ receives the acknowledgment indicating that station $1_Y$ is available as a server and station $1_1$ marks the arbitration bus;

at time $t_8$, station $1_1$ emits an information message towards server station $1_Y$;

at time $t_9$, server station $1_Y$ receives the message and frees the ARBITRATION bus; and at time $t_{10}$, $1_Y$ emits a further acknowledgment; the message has reached its destination; server station $1_\gamma$ frees the ARBITRATION and OCCUPATION buses.

A server station, having recognized its functional address i.e. its capacity (TRANS in this case) in the pre-message emitted by the requestor and, activating its allocator, can assume the following states:

immediate rejection either because the ARBITRATION bus is in the 1 state or because the OCCUPATION bus is in the 0 state; and arbitration temporization signal emission at the end of which there is:

rejection if the ARBITRATION bus remains at 1; or acceptance if the ARBITRATION bus is at 0.

The arbitration chronogram between server candidates brings to light the need for a hand-shaking type exchange procedure between a requestor station and a server station. The chain of events is as follows:

the requestor emits a pre-message containing the address of the requestor and a functional label;

the selected server sends back an acknowledgment;

the requestor emits the information message; and the server completes the exchange with a further acknowledgment.

A time interval $\tau$ is reserved between two ARBITRATION or OCCUPATION bus marking steps. This is necessary to enable the trailing edge of the marking pulses which corresponds to the marking termination to be detected by the stations waiting for the buses to be freed before the leading edge of the next marking pulse begins.

The allocation transmission parallelism

A study of the chronograms in FIGS. 3, 4 and 5 indicates this possibility of the proposed invention and a comparison between FIGS. 6 and 7 underlines the advantages thereof.

Indeed, FIG. 6 represents the prior art concatenation of events in the allocation and transmission operations and highlights the time losses caused by the allocation phases; the time loss becomes more significant as traffic increases and as the allocation time to transmission time ratio increases.

Even if it is possible to cut the allocation times down to a few microseconds, this cumulated overhead does nonetheless represents a loss amounting in certain cases of up to 50% of the DATA bus useful occupation time.

FIG. 7 represents the simultaneity between allocation and transmission phases where the DATA bus can thus work at maximum efficiency.

SELECTION CRITERIA AND DYNAMIC PRIORITY ALLOCATION

Since a conflict is always resolved to the benefit of that allocator with the longest temporization, this priority must pass via all the allocators such that they, on average, have the same chance of gaining access to the bus when coming up as candidates.

With this in mind, the device of the invention assigns to each allocator binary codes taken in a binary code field in which the code that fixes the arbitration temporization is drawn at random.

The codes necessarily differ from one allocator to another but are spread out in such a way that the arithmetic sum of the codes in the fields of all the allocators is the same for each of these fields; there is a distribution algorithm which guarantees service on a well-balanced average.

In a heavily loaded situation, the random approach can, however, cause a candidate station to wait for the bus for a time deemed abnormal. It is also possible that a station wishes to transmit a rather urgent message. In these cases, the possibility of pre-setting a high priority level is essential. This is a longer temporization than those for the allocation code fields.

The PRIORITY PRE-SETTING or FORCING signal is then responsible for activating this priority code. If the application so requires, a code field having an average duration value higher than that of other stations may also be allocated to certain stations.

ARBITRATION TEMPORIZATIONS

Mandatorily all different, their total number $N_T$ will be equal to the number of stations $N_S$ multiplied by their number per staion $N_C$ $$N_T = N_S \times N_C.$$

The arbitration signal duration is variable with its maximum value $\Delta$ max being a function of $N_T$ and the minimum deviation $\Sigma$ between two temporizations. Its minimum value $\Delta$ min must be greater than $\Sigma$ and its average value is given by:

$$(\Delta max + \Delta min)$$

DEVIATION $\Sigma$ CALCULATION

FIG. 10 depicts three stations $1_i$, $1_p$ and $1_N$, where $1_N$ is the end staion connected to ARBITRATION bus 5. Station $1_I$ is emitting and stations $1_p$ and $1_N$ are on standby pending emission. Signals propagate along the bus at a given speed $\theta$, equal for example to 5ns per meter. The distance between stations $1_I$ and $1_p$ is l and the propagation time between stations $1_I$ and $1_p$ is given by:

$$r = l/\theta,$$

while the distance between staions $1_p$ and $1_N$ is L, and the propagation time between stations $1_p$ and $1_N$ is $R = (L/\theta)$.

In FIG. 11, waveform a represents the moment the ARBITRATION bus is freed by station $1_I$. Waveforms b and c respectively indicate when the tests are performed in stations $1_p$ and $1_N$, assuming an infinite propagation speed. The temporization delays in stations $1_p$ and $1_N$ are respectively $(n+1)\Sigma$ and $n\Sigma$. As the temporization delay in station $1_p$ is greater than that in station $1_N$, the access conflict is resolved in favor of station $1_p$.

Waveforms d and e in FIG. 11 take into consideration a finite propagation speed and respectively show the tests being performed in stations $1_p$ and $1_N$ at the moments $$t_p = \tau + r + (n+1)\Sigma$$

$$t_N = \tau + r + R + n\Sigma,$$

respectively.

The test in station $i_p$ reaches station $1_N$ at the moment $$t'_p = \tau + r + R + (n+1)\Sigma$$

while the test in staion $1_N$ reaches station $1_p$ at the moment $$t'_N = \tau + r + 2R = n\Sigma.$$

The station $1_p$ allocator compares $t_p$ and $t'_N$, while the station $1_N$ allocator compares $t_N$ and $t'_p$. A necessary condition for the conflict to be resolved in favor of station $1_p$, that has the longest temporization, is that in station $1_p$, $t_p > t'_N$ and in station $1_N$ $t'_p > t_N$; the second inequality is always borne out. The first gives $$\Sigma > 2R$$

If $\Sigma$ were less than 2R, then depending on the sign of $\Sigma$, the conflict can be resolved in favor of station $1_p$; indeed this may even be to the detriment of both stations $1_p$ and $1_N$ which then both withdraw.

ARBITRATOR FUNCTIONING

While the requestor and server arbitrators are identical to resolve conflicts, there are certain differences between them, namely: the authorization conditions associated with the states of the ARBITRATION and OCCUPATION buses and the fact that one memorizes the candidate state whilst the other does not.

Figure 8:
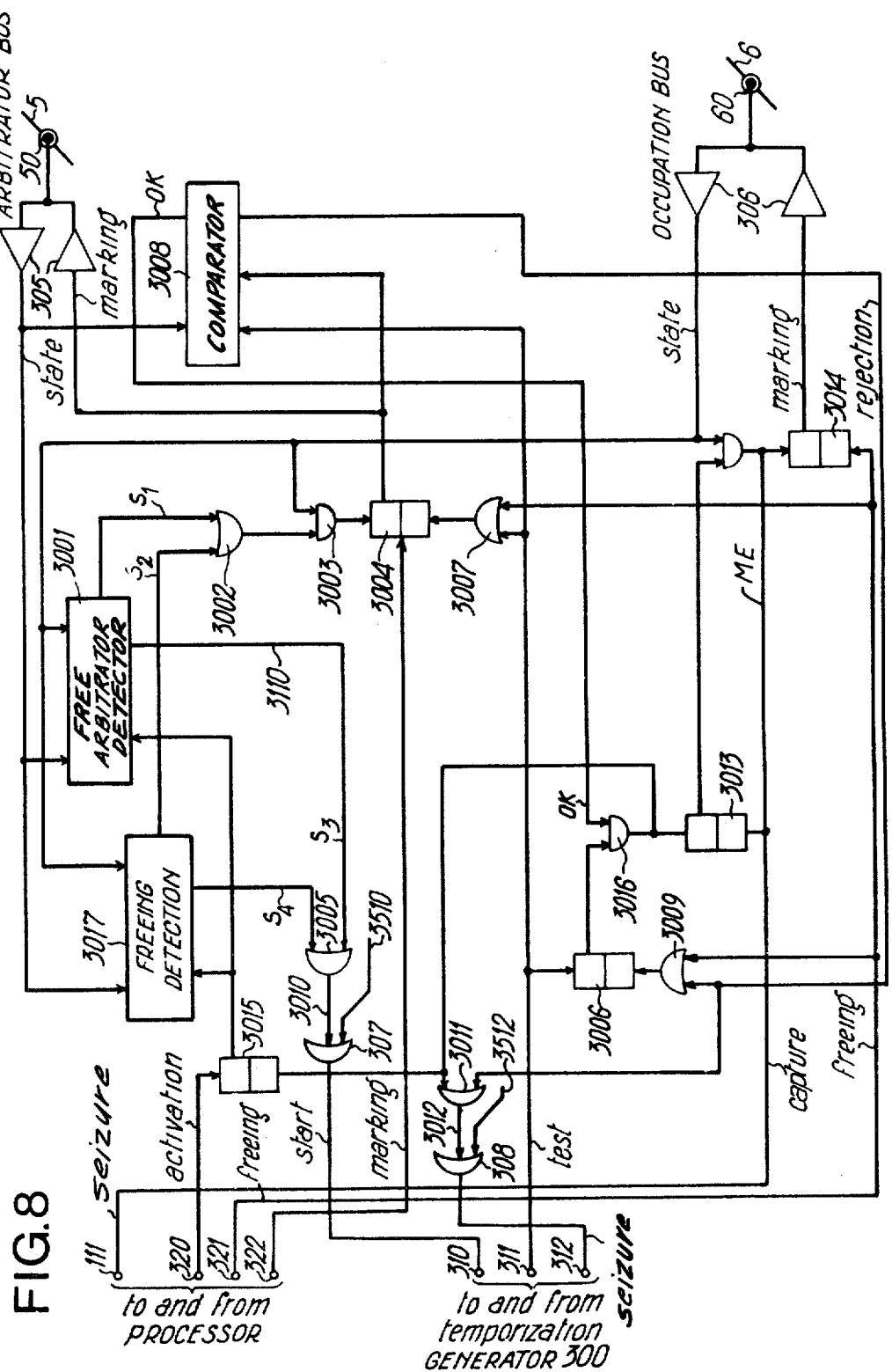
FIG. 8 is a block diagram of a "requestor" arbitration circuit.

1. Request arbitrator (FIG. 8)

As soon as a station becomes a requesting candidate, the processor of that station supplies a "request arbitrator activation" signal (000, per Table I) to decoder 304 via lines 113-115. Decoder supplies a signal to lead 320 to trigger flip-flop 3015. Several possibilities are then available:

1.1 Arbitration bus 5 and OCCUPATION bus 60 are both free 1.11. FREE ARBITRATOR detector 3001 generates a signal $S_1$ which, via OR gate 3002 and AND gate 3003, marks ARBITRATOR bus 5 by means of flip-flop 3004. A signal $S_3$ also generated by free detector 3001 triggers wire 3110, via OR gate 3005, wire 3010, OR gate 307, "start" wire and terminal 310 of the arbitrator temporization generator 300. This is the "start" signal. Once this temporization is over counter 302 produces a TEST signal on terminal 311 which is memorized, i.e., stored in flip-flop 3006. The TEST signal also resets flip-flop 3004 via OR gate 3007 and activates a comparator 3008 which compares the state of flip-flop 3004 with that of ARBITRATION bus 5.

There are two possibilities:

1.111. If there is a difference indicated by a rejection signal from comparator 8, a higher-priority station is holding the ARBITRATION bus in state 1. The rejection signal resets flip-flop 3006 via OR gate 3009 and sends a seizure signal via OR gate 3011, wire 3012 and terminal 312 to temporization generator 300 that causes an arbitration temporization to be derived at random from the binary code field 303.

1.112. If there is no difference indicated by comparator 8, signal OK, indicating that ARBITRATION bus 5 is at 0 and therefore that the allocator has priority. The OK signal is fed to AND gate 3016, causing gate 3016 to derive MA signal that indicates that the allocator has the mastership on the DATA bus. The MA signal activates flip-flop 3013 to a 1 state that is compared with that of the OCCUPATION bus. There are two possibilities:

1.1121. The OCCUPATION bus is free: the ME signal is produced by flip-flop 3013. The ME signal is supplied via terminal 111 to the processor to indicate that the DATA bus has been seized. The station can now emit the message it has ready for transmission. The ME signal stored in flip-flop 3014 also marks the OCCUPATION bus as being engaged. At the end of these exchanges with a server station, the processor generates a freeing signal (100, per Table I) which activates flip-flops 3004 and 3014 back to the rest position and, as a result, frees ARBITRATION and OCCUPATION buses 5 and 6.

The MARKING signal is produced by the station on terminal 322 once acknowledgment of the pre-message has been received (see FIG. 5).

1.1122. The OCCUPATION bus has already been taken: the MA mastership state is stored in flip-flop 3013 until the bus has been freed which brings about the process of step 1.1121.

1.2. ARBITRATION bus 5 is free and OCCUPATION bus is marked 1.21. The gate 3003 is blocked and the activation signal from the processor is stored in flip-flop 3015 and nothing happens until the OCCUPATION bus has been freed which causes the ARBITRATION bus 5 marking signal $S_1$ to be produced by means of free arbitrator detector 3001. The process then follows the same sequence as above.

1.3. ARBITRATION bus is engaged

In this case, regardless of the state of OCCUPATION bus 6, there is a stand-by period whilst waiting for the ARBITRATOR bus to be freed. This will then activate freeing detection device 3017, if at that particular moment, the OCCUPATION bus is free. Two signals $S_2$ and $S_4$ are generated by detector 3017. $S_2$ has the same function as $S_1$ and $S_4$ as $S_3$.

Figure 9:
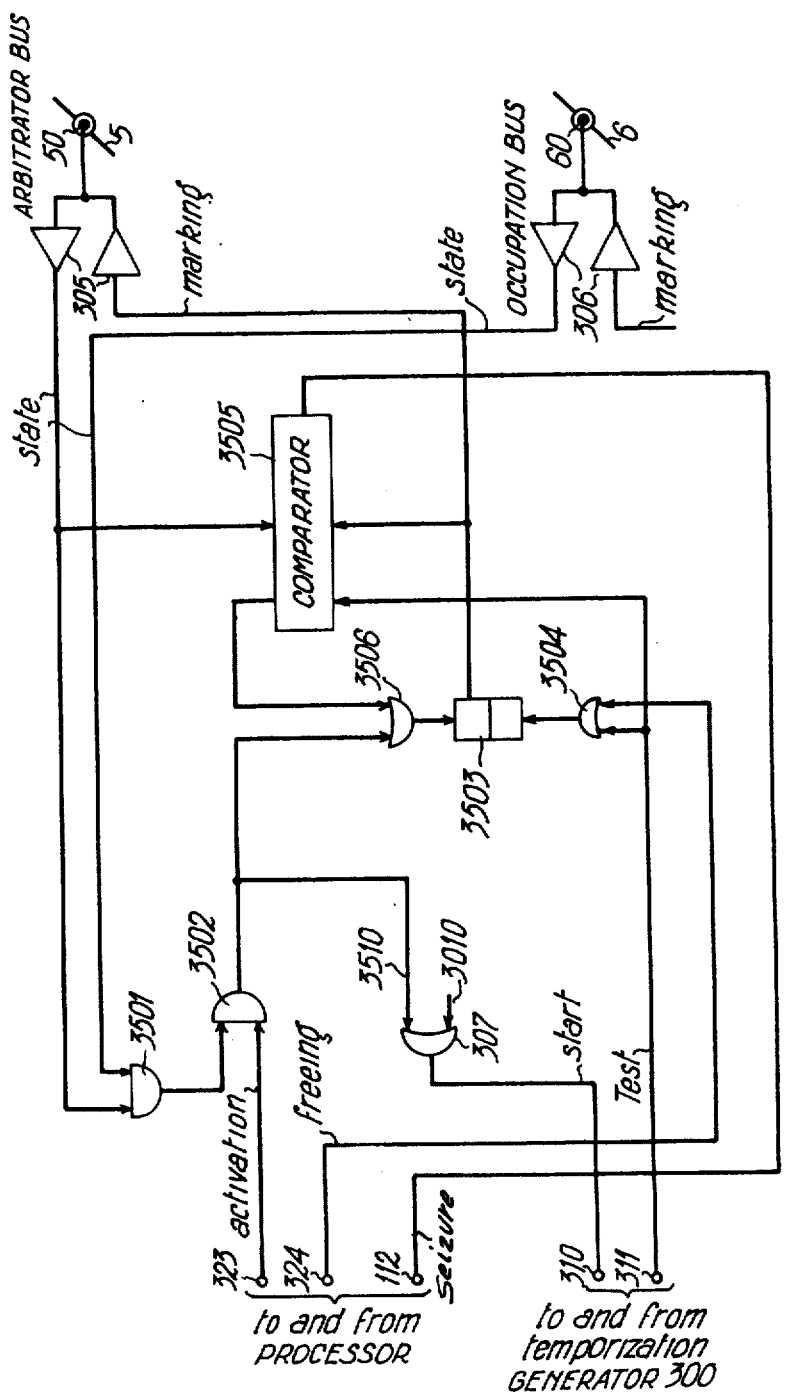
FIG. 9 is a block diagram of a "server" arbitration circuit.

2. "Serve" arbitrator (FIG. 9)

The operation procedure of this element is very straightforward as it has no memory function.

A station that has "recognized" itself as being a server candidate following decoding of a pre-message functional label that it has just received, and that it is in a position to process, activates the serve arbitrator through the ACTIVATION signal (110, per Table i) applied to wires 113-115; this occurs after the output 323 of decoder 304 has been detected by AND gate 3502.

Several possibilities:

2.1 ARBITRATION bus 5 has a value 1 and OCCUPATION bus 6 has a 0 or 1 value

Nothing occurs and there is an immediate rejection. The station abandons its role as server.

2.2. ARBITRATION bus 5 has a 0 value and OCCUPATION bus 6 has a 0 value

Nothing occurs and there is immediate rejection.

2.3. ARBITRATION bus 5 is on 0 value and OCCUPATION bus 6 has a 1 value 1

AND gates 3501 and 3502 become enabled to pass signals supplied to them. Flip-flop 3503 marks the ARBITRATION bus and the START signal (at terminal 310) activates arbitration temporization generator 300. This produces the TEST signal (terminal 311) once the temporization is over. The test signal frees flip-flop 3503 via OR gate 3504 and activates comparator 3505. There are two possibilities:

2.31. ARBITRATION bus is on 0. It is captured; the station becomes a "server" and can emit an acknowledgment. Comparator 3505 unmarks the ARBITRATION bus forthwith via OR gate 3506. Freeing takes place after data reception.

2.32. ARBITRATION bus remains on 1; rejection occurs, a higher-priority server holds the ARBITRATOR bus.

In the foregoing description, the ARBITRATION and OCCUPATION buses have been assumed as being separate, with each having two marking and unmarking signals respectively; these two buses could, of course, be replaced by a single bus having four values representing the combined ARBITRATION and OCCUPATION marking and unmarking.

It is clear from the preceding specification that, at the time a station is a candidate for sending a message or for signalling an acknowledgment to an already received message, the station has not yet at its disposal a permanent or cyclically varying priority number. On the contrary, it draws such a priority number at random as a temporization signal.

I claim:

1. A data transmission and access conflict settling system including a plurality of asynchronous and unranked data transmitters-receivers divided into a requestor category and a server category, the transmitters-receivers of the server category implementing services requested by the transmitters-receivers of the requestor category, the said transmitters-receivers being interconnected by (1) a data transmission bus, (2) an occupation bus having a state dependent upon the availability or unavailability of the data transmission bus and (3) an arbitration bus, said data transmission system comprising, in each transmitter-receiver:

an allocation circuit associated with the transmitter-receiver and selectively connecting the transmitter-receiver to the arbitration bus, said allocation circuit having means for marking said arbitration bus and means for testing said arbitration bus;

an arbitration pulse generator for deriving arbitration pulses having randomly distributed durations, the durations of the arbitration pulses generated by the arbitration pulse generator in the different transmitters-receivers being different;

means controlled by a transmitter-receiver requesting service, coupled to the arbitration pulse generator, for activating the arbitration pulse generator to randomly extract therefrom an arbitration pulse;

means coupled to the marking means of the allocation cicuit for activating the marking means of the allocation circuit while said randomly extracted arbitration pulse is being derived;

means coupled to the testing means of the allocation circuit for activating the testing means of the allocation circuit at the end of said randomly extracted arbitration pulse to thereby derive a binary test pulse having a binary value dependent on the marking or unmarking of the arbitration bus; and means coupled to the occupation bus and testing means of the allocation circuit for activating the transmitter-receiver to capture the data transmission bus depending on the state of the occupation bus and the binary value of the test pulse.

2. A data transmission system according to claim 1 wherein the arbitration pulse generator of the different transmitters-receivers comprises means for establishing a field of several numbers which are different in each tranmsitter-receiver but have sums which are equal in the different transmitters-receivers, and means for generating pulses having durations proportional to said numbers.

3. An asynchronous and unranked data transmitter-receiver in a data transmission and access conflict settling system including a plurality of such data transmitters-receivers divided into a requestor category and a server category, the transmitters-receivers of the server category implementing services requested by the transmitters-receivers of the requestor category, the said transmitters-receivers being interconnected by, (1) a data transmission bus, (2) an occupation bus having a state dependent upon the availability or unavailability of the data transmission bus and (3) an arbitration bus, said transmitter-receiver comprising:

an allocation circuit associated with the transmitter-receiver and selectively connecting the transmitter-receiver to the arbitration bus, said allocation circuit having means for marking said arbitration bus and means for testing said arbitration bus;

an arbitration pulse generator for deriving arbitration pulses having randomly distributed durations, the durations of the arbitration pulses generated by the arbitration pulse generator in the different transmitters-receivers being different;

means controlled by a transmitter-receiver requesting service, coupled to the arbitration pulse generator, for activating the arbitration pulse generator to randomly extract therefrom an arbitration pulse;

means coupled to the marking means of the allocation circuit for activating the marking means of the allocation circuit while said randomly extracted arbitration pulse is being derived;

means coupled to the testing means of the allocation circuit for activating the testing means of the allocation circuit at the end of said randomly extracted arbitration pulse to thereby derive a binary test pulse having a binary value dependent on the marking or unmarking of the arbitration bus; and means coupled to the occupation bus and testing means of the allocation circuit for activating the transmitter-receiver to capture the data transmission bus depending on the state of the occupation bus and the binary value of the test pulse.

4. The transmitter-receiver according to claim 3 wherein the arbitration pulse generator of the different transmitters-receivers comprises means for establishing a field of several numbers which are different in each transmitter-receiver but have sums which are equal in the different transmitters-receivers, and means for generating pulses having durations proportional to said numbers.

* * * * *